(12) United States Patent
Shiga et al.

(10) Patent No.: US 11,052,954 B2
(45) Date of Patent: Jul. 6, 2021

(54) VEHICULAR STRAIGHTENING DEVICE

(71) Applicant: AISIN SEIKI KABUSHIKI KAISHA, Kariya (JP)

(72) Inventors: Tokuhiro Shiga, Obu (JP); Yukihide Shibutani, Nagoya (JP); Hideki Mizuno, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 351 days.

(21) Appl. No.: 16/181,454

(22) Filed: Nov. 6, 2018

(65) Prior Publication Data

US 2019/0152543 A1    May 23, 2019

(30) Foreign Application Priority Data

Nov. 20, 2017    (JP) .............................. JP2017-222792

(51) Int. Cl.
*B62D 37/02*    (2006.01)
*B62D 35/00*    (2006.01)
*B62D 35/02*    (2006.01)

(52) U.S. Cl.
CPC ........... *B62D 37/02* (2013.01); *B62D 35/005* (2013.01); *B62D 35/02* (2013.01)

(58) Field of Classification Search
CPC ......... B62D 35/05; B62D 35/02; B62D 37/02
See application file for complete search history.

(56) References Cited

U.S. PATENT DOCUMENTS

| 2010/0156142 A1* | 6/2010 | Sumitani | B62D 37/02 296/180.1 |
| 2011/0001334 A1* | 1/2011 | Hirano | B62D 25/16 296/180.1 |
| 2016/0068203 A1* | 3/2016 | Uchiyama | B62D 37/02 296/180.1 |
| 2017/0057567 A1* | 3/2017 | Aoki | B62D 37/02 |
| 2017/0291649 A1* | 10/2017 | Zuhlsdorf | B60T 5/00 |

FOREIGN PATENT DOCUMENTS

| JP | 5105124 A | | 4/1993 |
| JP | 2006069396 A | * | 3/2006 |
| JP | 2009143396 A | | 7/2009 |
| JP | 2017052338 A | | 3/2017 |

\* cited by examiner

*Primary Examiner* — Peter D Nolan
*Assistant Examiner* — Demetra R Smith-Stewart
(74) *Attorney, Agent, or Firm* — Buchanan Ingersoll & Rooney PC

(57) ABSTRACT

A vehicular straightening device includes: a straightening member disposed in front of a front wheel of a vehicle so as to be movable upward and downward with respect to a vehicle body; a drive unit that moves the straightening member up and down with respect to the vehicle body between a storage position on a vehicle body side and a straightening position where the straightening member protrudes downward from the vehicle body; and a connecting mechanism that connects the straightening member and the drive unit and releases a connection between the straightening member and the drive unit when an external force acts on the straightening member at the straightening position.

10 Claims, 6 Drawing Sheets

VEHICULAR STRAIGHTENING DEVICE

CROSS REFERENCE TO RELATED APPLICATIONS

This application is based on and claims priority under 35 U.S.C. § 119 to Japanese Patent Application 2017-222792, filed on Nov. 20, 2017, the entire contents of which are incorporated herein by reference.

TECHNICAL FIELD

This disclosure relates to a vehicular straightening device including a straightening member disposed in front of a front wheel of a vehicle to be movable upward and downward with respect to a vehicle body.

BACKGROUND DISCUSSION

In the related art, as a vehicular straightening device of this type, there is known a straightening device including a spat (straightening member) disposed in front of a front wheel of a vehicle, a drive unit for positioning the spat just before the front wheel and disengaging the spat from the position, a speed sensor, and a controller for the drive unit (for example, refer to JP H05-105124A). The controller of the vehicular straightening device controls the drive unit so as to position the spat just before the front wheel when a vehicle speed detected by the speed sensor is a predetermined value or greater. In this manner, it is possible to suppress the increase in pressure in front of the front wheel by eliminating the airflow hitting the front wheel while the vehicle is traveling at a high speed and to reduce air resistance and lift to the vehicle. In addition, as the vehicular straightening device, there is also known a straightening device including a straightening member disposed in front of a front wheel and rotatably and pivotally supported by a vehicle body, a drive unit that rotates the straightening member between a drooping position (straightening position) on the lower side of the vehicle body and a storage position on the vehicle body side, and a control portion for controlling the drive unit (for example, refer to JP 2017-52338A).

In the vehicle equipped with the above-described vehicular straightening device, when the straightening member is positioned at the straightening position, it is possible to improve the aerodynamic performance of the vehicle by eliminating the airflow hitting on the front wheel, and to improve fuel economy and the like. However, there is a possibility that an external force due to a collision with an obstacle or the like acts on the straightening member at the straightening position while the vehicle is traveling, and there is a possibility that the drive unit is damaged due to the action of external force to the straightening member.

Thus, a need exists for a vehicular straightening device which is not susceptible to the drawback mentioned above.

SUMMARY

A vehicular straightening device according to an aspect of this disclosure includes a straightening member disposed in front of a front wheel of a vehicle so as to be movable upward and downward with respect to a vehicle body, a drive unit that moves the straightening member up and down with respect to the vehicle body between a storage position on a vehicle body side and a straightening position where the straightening member protrudes downward from the vehicle body, and a connecting mechanism that connects the straightening member and the drive unit and releases a connection between the straightening member and the drive unit when an external force acts on the straightening member at the straightening position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Next, aspects for performing this disclosure will be described with reference to the drawings.

Figure 1:
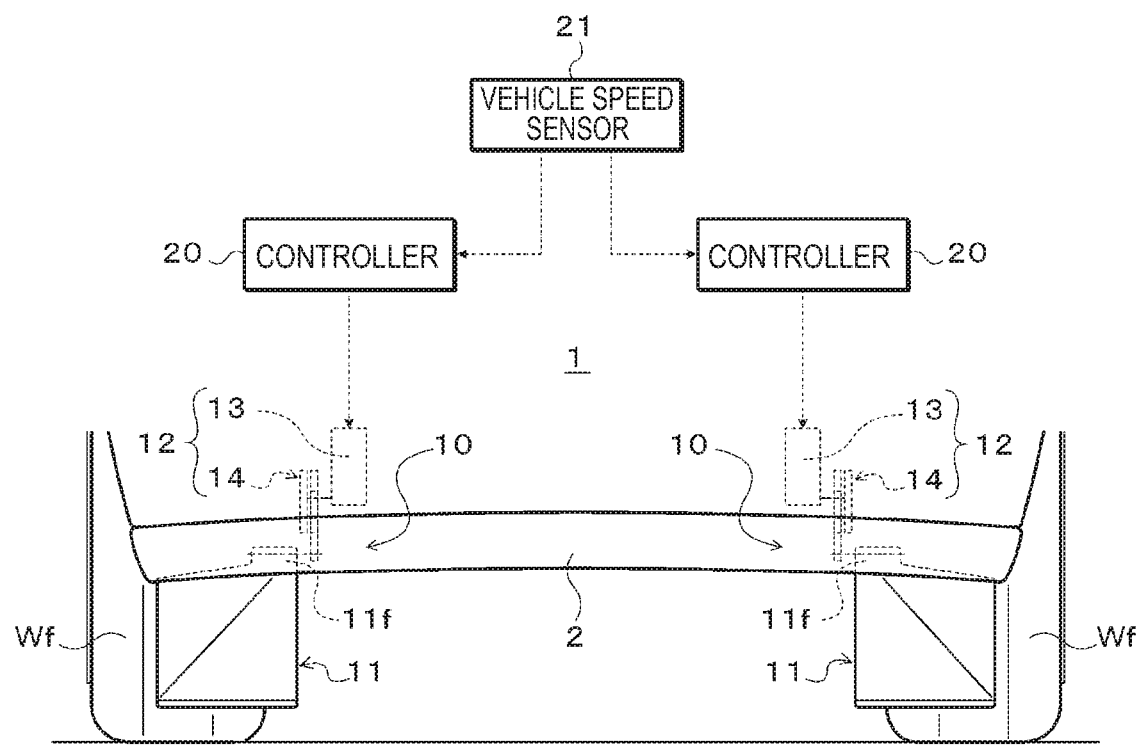
FIG. 1 is a schematic configuration diagram illustrating a vehicular straightening device of this disclosure.
Figure 2:
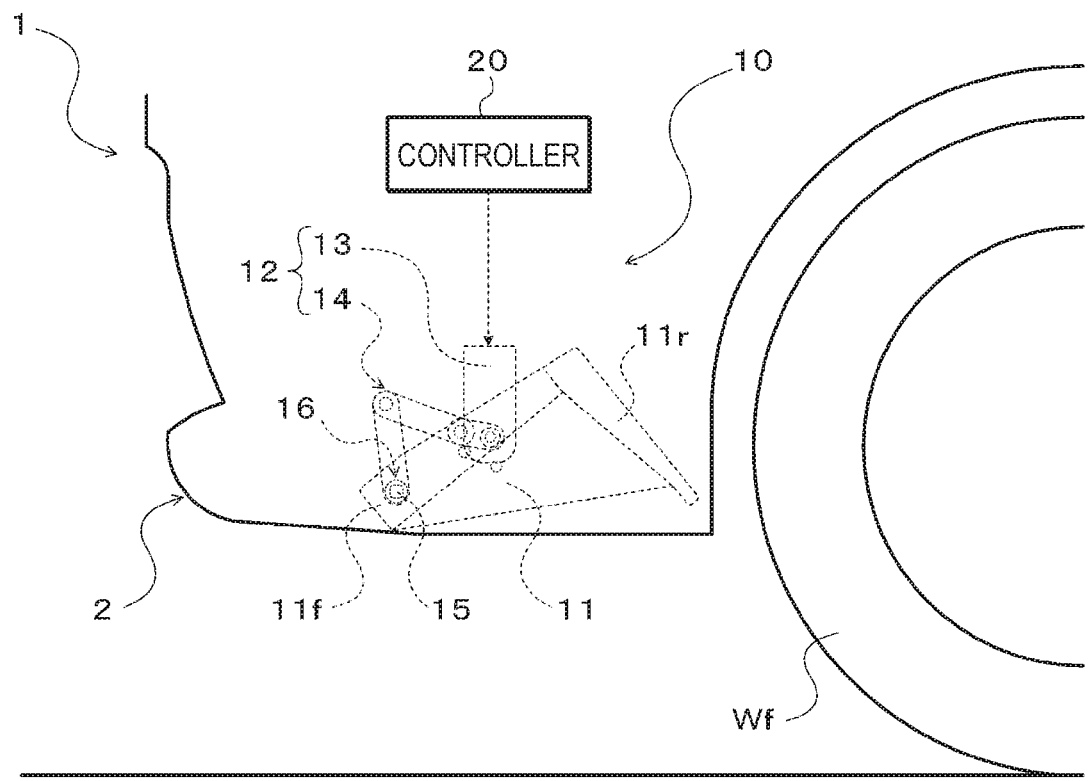
FIG. 2 is a schematic configuration diagram illustrating the vehicular straightening device of this disclosure.

FIGS. 1 and 2 are schematic configuration diagrams illustrating a vehicular straightening device 10 of this disclosure. The vehicular straightening device 10 illustrated in these drawings is provided for each front wheel Wf of a vehicle 1, and is a straightening device that suppresses an increase in pressure caused by the air from the front hitting the corresponding front wheel Wf (tire) and reduces the air resistance and lift of the vehicle 1. As illustrated in FIG. 1, the vehicular straightening device 10 includes a straightening member 11 (spat) disposed to be movable upward and downward with respect to a vehicle body 2 (bumper in the present embodiment) in front of the front wheel Wf of the vehicle 1, a drive unit 12 that moves the straightening member 11 up and down with respect to the vehicle body 2, and a controller 20 that controls the drive unit 12.

Figure 3:
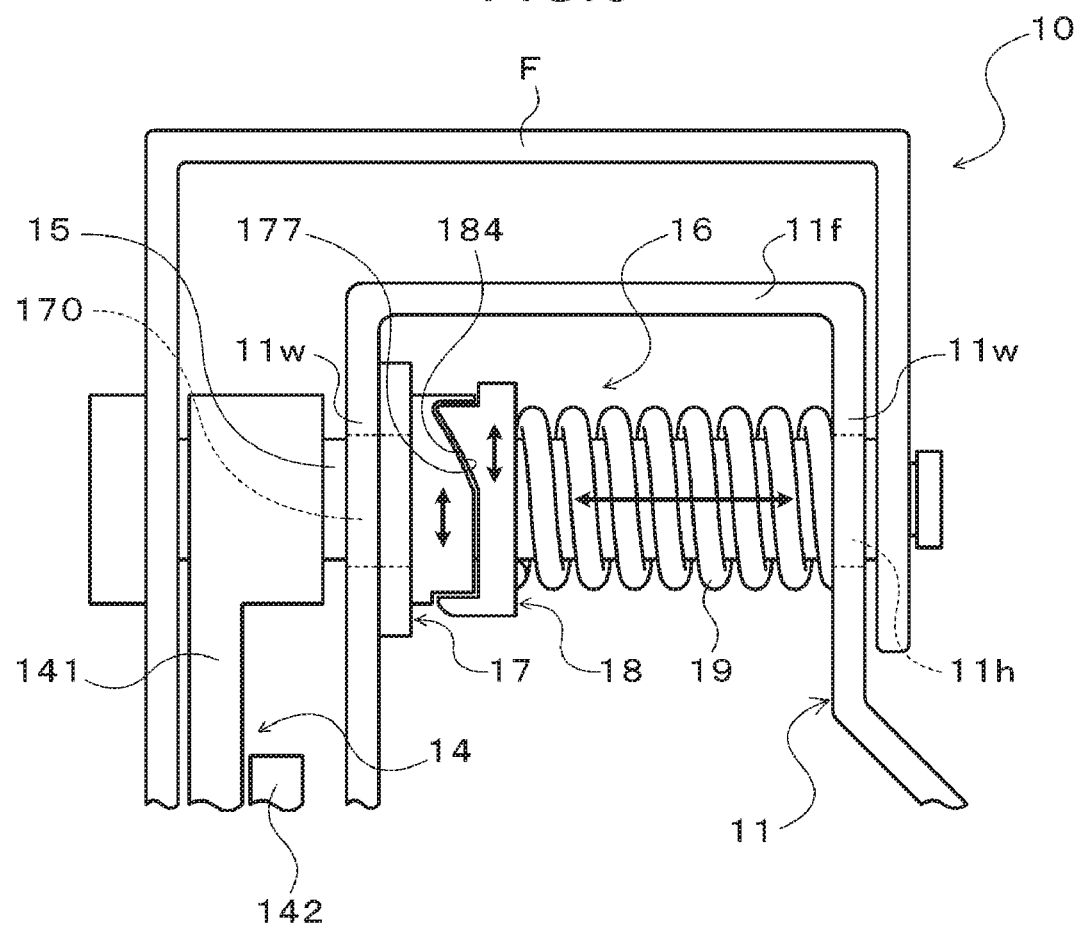
FIG. 3 is an enlarged view illustrating a main part of the vehicular straightening device of this disclosure.

The straightening member 11 is formed of a resin, and has a straightening surface formed so as to spread downward (road surface side) and outward in the vehicle width direction from a front end portion 11f positioned on a front side of the vehicle 1 toward a rear end portion 11r positioned on a rear side of the vehicle 1 (refer to FIG. 2). As illustrated in FIGS. 2 and 3, the front end portion 11f of the straightening member 11 is rotatably supported by the vehicle body 2 through a rotary shaft 15 rotatably supported by a frame F (refer to FIG. 3) fixed to the vehicle body 2 (bumper) so that the rear end portion 11r moves up and down with respect to the vehicle body 2. The shape of the straightening member 11 (straightening surface) can be set to a predetermined shape.

Figure 4:
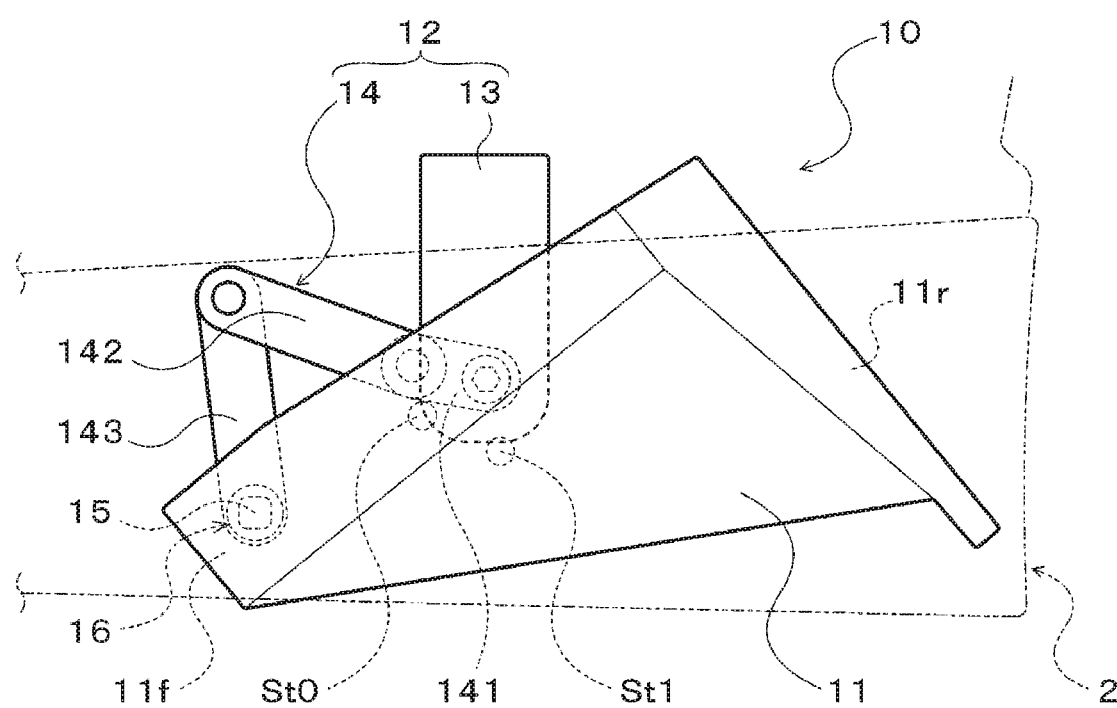
FIG. 4 is an enlarged view illustrating a main part of the vehicular straightening device of this disclosure.

The drive unit 12 includes an actuator 13 including a motor (DC motor), a gear mechanism, and the like (not illustrated) and fixed to the frame F (or vehicle body 2), and a link mechanism 14 connecting the straightening member 11 and the actuator 13. As illustrated in FIG. 4, the link mechanism 14 includes a driving link 141 rotated by the actuator 13, an intermediate link 142 whose one end is rotatably connected (pin-connected) to a free end of the driving link 141, and a driven link 143 rotatably connected (pin-connected) to the other end of the intermediate link 142. In the link mechanism 14 of the present embodiment, a link length of the driving link 141 is set to be the shortest. In addition, the rotary shaft 15 is fixed to an end portion of the driven link 143 on a side opposite to the intermediate link 142 side. In the present embodiment, the rotary shaft 15 is a quadrilateral tapered shaft having a substantially square cross-sectional shape, and one end portion of the rotary shaft 15 is fitted (fixed) to a hole portion having a substantially square cross-sectional shape formed at the end portion of the driven link 143.

Furthermore, the vehicular straightening device 10 includes a connecting mechanism 16 connecting the straightening member 11 and the drive unit 12. As illustrated in FIG. 3, the connecting mechanism 16 is disposed inside the front end portion 11f of the straightening member 11 formed with a channel shape (U-shaped frame shape), and includes a first collar member 17, a second collar member 18 (connecting member), and a spring 19 (biasing member) as compressive coil spring, which form an engaging portion of the straightening member 11. The spring 19 may be an elastic body other than a compressive coil spring such as a disc spring or the like.

Figure 5:
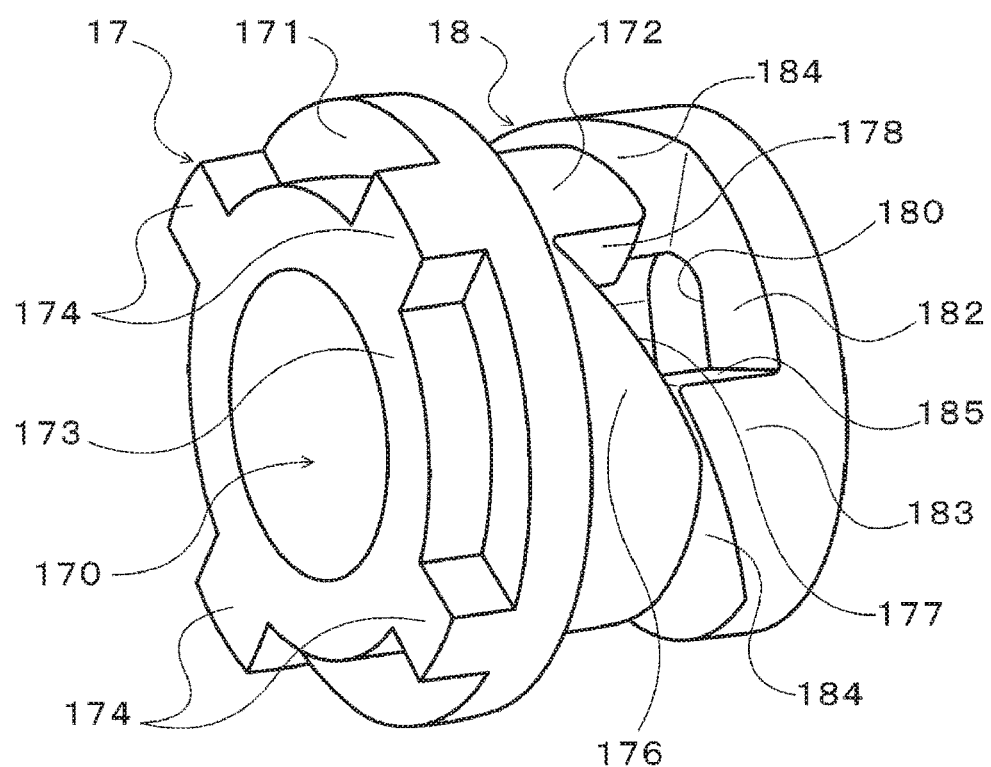
FIG. 5 is a perspective view illustrating a main part of a connecting mechanism of the vehicular straightening device of this disclosure.
Figure 6:
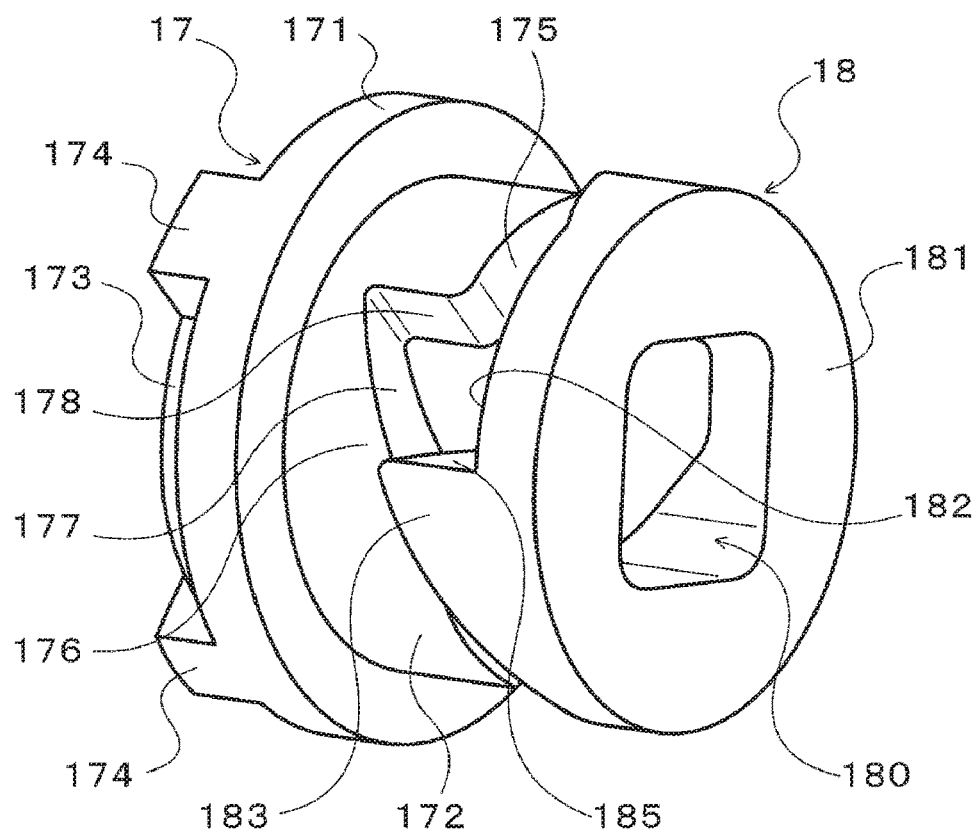
FIG. 6 is a perspective view illustrating a main part of the connecting mechanism of the vehicular straightening device of this disclosure.

As illustrated in FIGS. 5 and 6, the first collar member 17 of the connecting mechanism 16 is an annular member made of resin or metal having a circular hole 170 penetrating the center portion, and includes both a short-sized large diameter tubular portion 171 and a short-sized small diameter tubular portion 172. In the present embodiment, the inner diameter of the circular hole 170 is set to be slightly larger than the maximum diameter (distance between facing corner portions (rounded portions) to each other) of the rotary shaft 15 serving as a quadrangular tapered shaft. In addition, at the end portion of the large diameter tubular portion 171 on the side opposite to the small diameter tubular portion 172 side, an annular reduced diameter portion 173 and a plurality (for example, four in this embodiment) of protrusion portions 174 protruding radially outward from an outer peripheral surface of the reduced diameter portion 173 are formed.

As illustrated in FIG. 6, the small diameter tubular portion 172 of the first collar member 17 includes a flat end surface 175 orthogonal to the axis of the first collar member 17. In addition, in the small diameter tubular portion 172, a plurality (for example, three in this embodiment) of pressure portions 176 are formed at intervals (at regular intervals) in the circumferential direction of the small diameter tubular portion 172 by cutting out a portion of a tubular wall portion, and a spiral surface (normal spiral surface) 177 is formed in each pressure portion 176. The spiral surface 177 is an inclined surface (curved surface) extending spirally around an axis of the first collar member 17 so as to be close to the large diameter tubular portion 171 while being separated from the end surface 175 from a front side (upstream side) to a rear side (downstream side) in a clockwise direction when the small diameter tubular portion 172 is viewed from the side of the end surface 175 in front view. Furthermore, the small diameter tubular portion 172 includes a plurality (for example, three in this embodiment) of flat torque transmitting surfaces 178 extending in the axial direction of the first collar member 17 from the bottom portion of the corresponding spiral surface 177 to the end surface 175, and extending in the radial direction of the first collar member 17 toward the circular hole 170.

As illustrated in FIGS. 5 and 6, the second collar member 18 of the connecting mechanism 16 is an annular member made of resin or metal having a connecting hole 180 having a substantially square cross-sectional shape penetrating the center portion. The rotary shaft 15 serving as a square tapered shaft is fitted in the connecting hole 180 movably in the axial direction. In addition, the second collar member 18 includes a flat rear surface 181 orthogonal to the axis of the second collar member 18, and a flat inner surface 182 positioned on the side opposite to the rear surface 181 and orthogonal to the axis. Furthermore, a plurality (for example, three in this embodiment) of pushed portions 183 (abutting portions) are formed on the second collar member 18 so as to protrude in the axial direction from the inner surface 182 at intervals (at regular intervals) in the circumferential direction of the second collar member 18. A spiral surface 184 (normal spiral surface) which can be closely abutted on the spiral surface 177 of the first collar member 17 is formed in each pushed portion 183. The spiral surface 184 is an inclined surface (curved surface) extending spirally around an axis of the second collar member 18 so as to be separated from the inner surface 182 from a front side (upstream side) to a rear side (downstream side) in a counterclockwise direction when the second collar member 18 is viewed from the side of the inner surface 182 in front view. In addition, the second collar member 18 includes a plurality (for example, three in this embodiment) of flat torque transmitting surfaces 185 extending in the axial direction of the second collar member 18 from the top portion of the corresponding spiral surface 184 to the inner surface 182, and extending in the radial direction of the second collar member 18 toward the connecting hole 180.

Figure 7:
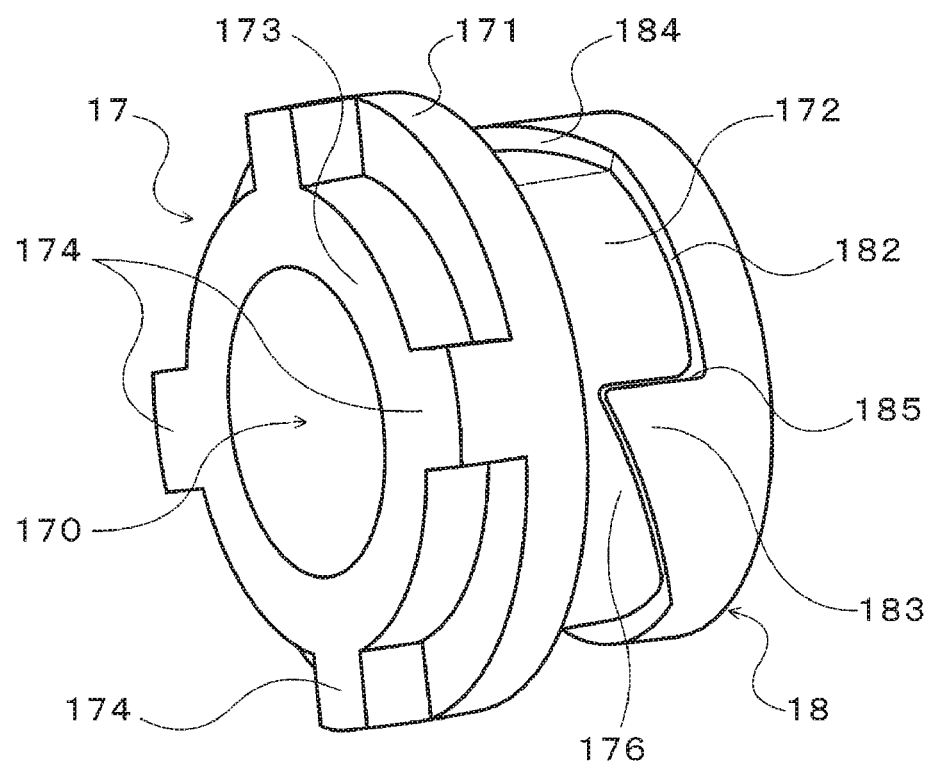
FIG. 7 is a perspective view illustrating a main part of the connecting mechanism of the vehicular straightening device of this disclosure.
Figure 8:
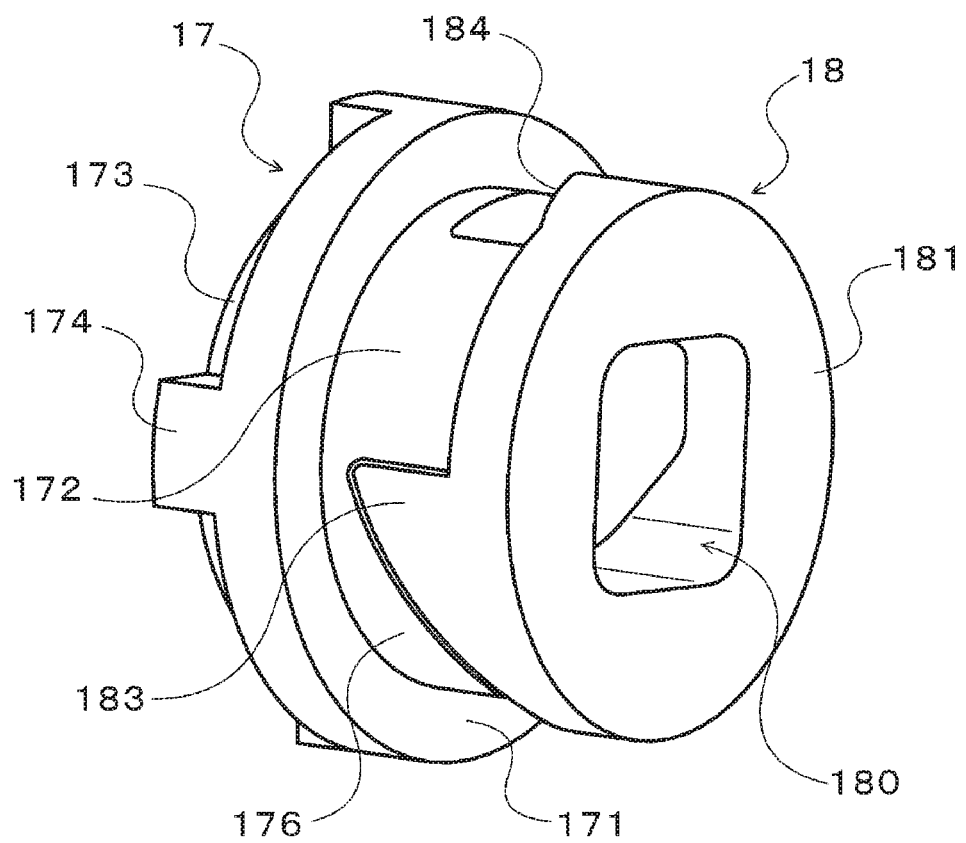
FIG. 8 is a perspective view illustrating a main part of the connecting mechanism of the vehicular straightening device of this disclosure.

As illustrated in FIG. 3, the first collar member 17 of the connecting mechanism 16 is fixed to one of a pair of wall portions 11w (wall portion 11w on the left side in the drawing) forming the front end portion 11f so as to be positioned in the front end portion 11f of the straightening member 11. That is, on the one wall portion 11w, a hole portion having an opening shape matching an outline of the reduced diameter portion 173 and the plurality of protrusion portions 174 of the first collar member 17 is formed. The reduced diameter portion 173 and the plurality of protrusion portions 174 are fitted (press fitted) into the hole portions of the wall portion 11w. In this manner, the first collar member 17 is non-rotatably fixed to the straightening member 11. In addition, as can be seen from FIGS. 7 and 8, the second collar member 18 of the connecting mechanism 16 is disposed within the front end portion 11f of the straightening member 11 so that the spiral surface 184 of each pushed portion 183 faces the spiral surface 177 of the corresponding pressure portion 176 of the first collar member 17, each torque transmitting surface 185 faces the corresponding torque transmitting surface 178 of the first collar member 17, and the inner surface 182 faces the end surface 175 of the first collar member 17. Furthermore, the spring 19 of the connecting mechanism 16 is disposed between the rear surface 181 of the second collar member 18 and the other of the pair of wall portions 11w (right wall portion 11w in the drawing). On the other wall portion 11w, a circular hole 11h is formed so as to face a hole portion formed in the one wall portion 11w. The inner diameter of the circular hole 11h is set slightly larger than the maximum diameter of the rotary shaft 15 serving as a square tapered shaft.

In addition, the rotary shaft 15 is inserted through the circular hole 170 of the first collar member 17 fixed to the straightening member 11, the connecting hole 180 of the second collar member 18, the inside of the spring 19, and the circular hole 11h of the other wall portion 11w. Both end portions of the rotary shaft 15 are rotatably supported by the frame F. As described above, each of the circular hole 170 of the first collar member 17 and the circular hole 11h of the other wall portion 11w has an inner diameter slightly larger than the maximum diameter of the rotary shaft 15. In this manner, the front end portion 11f (and first collar member 17) of the straightening member 11 is freely rotatable around the rotary shaft 15, and the straightening member 11 is rotatably supported by the frame F (vehicle body 2) so that the rear end portion 11r moves up and down with respect to the vehicle body 2. Furthermore, the second collar member 18 can move in the axial direction with respect to the rotary shaft 15, and when the rotary shaft 15 is fitted in the connecting hole 180, the second collar member 18 can rotate integrally with the rotary shaft 15. In addition, the second collar member 18 is biased in the axial direction of the rotary shaft 15 toward the first collar member 17 by the spring 19 so that each spiral surface 184 abuts on the corresponding spiral surface 177 of the first collar member 17, each torque transmitting surface 185 abuts on the corresponding torque transmitting surface 178 of the first collar member 17, and the inner surface 182 abuts on the end surface 175 of the first collar member 17.

As described above, the second collar member 18 is biased against the first collar member 17 by the spring 19, so that the first and second collar members 17 and 18 engage integrally and rotatably with each other, and the second collar member 18 and the rotary shaft 15 are connected to the straightening member 11 through the first collar member 17. Furthermore, the driven link 143 of the link mechanism 14 is disposed between one of the pair of wall portions 11w and the frame F, and the end portion of the rotary shaft 15 (end portion on the left side in the drawing) is fitted (fixed) to a hole portion formed on the end portion of the driven link 143. In this manner, the driven link 143, that is, the link mechanism 14 is connected to the straightening member 11 through the rotary shaft 15, the first and second collar members 17 and 18, that is, the connecting mechanism 16.

As can be seen from FIG. 4, the straightening member 11, the link mechanism 14, and the frame F supporting the straightening member 11 and the actuator 13 form a four-link link mechanism (four-link rotational chain) with the frame F (vehicle body 2) as a fixed link. In this manner, the actuator 13 is operated to rotate the driving link 141 of the link mechanism 14 in the forward direction or the reverse direction, so that it is possible to rotate the rotary shaft 15 to move the straightening member 11 up and down with respect to the vehicle body 2 between a predetermined storage position and a straightening position.

In the embodiment, as illustrated in FIG. 4, when the driving link 141 and the intermediate link 142 extend substantially in a straight line without overlapping each other, the link mechanism 14 is designed so that the straightening member 11 is positioned in the storage position illustrated in FIG. 4 and stored in the vehicle body 2. Furthermore, the vehicular straightening device 10 includes a storage side stopper St0 (second stopper) for holding the straightening member 11 at the storage position on the vehicle body 2 side. In the present embodiment, the storage side stopper St0 is a protrusion protruding from the inner surface of the frame F to the rotary shaft 15 in the axial direction. The storage side stopper St0 is disposed so as to abut on one side surface of the driving link 141 at a position where the rotation direction of the intermediate link 142 with respect to the driving link 141 is changed when the driving link 141 is rotated in the counterclockwise direction (storage direction) in the drawing by the actuator 13, that is, a position slightly beyond a change point of the link mechanism 14 when the driving link 141 rotates in the storage direction.

Figure 9:
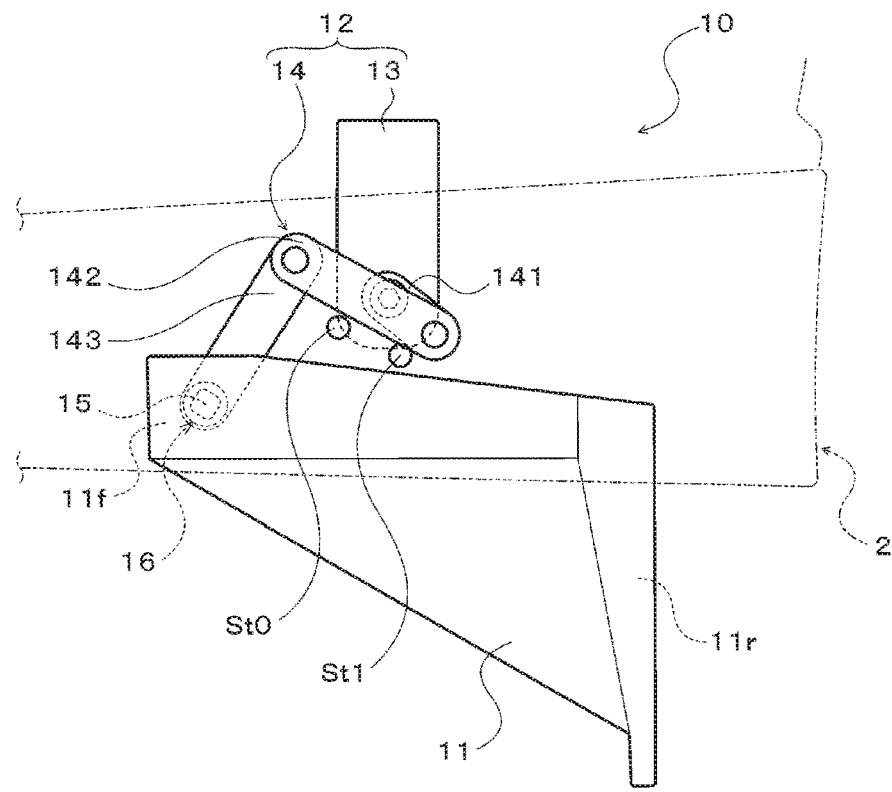
FIG. 9 is a schematic configuration diagram for describing an operation of the vehicular straightening device of this disclosure.

In addition, as illustrated in FIG. 9, when the driving link 141 and the intermediate link 142 extend substantially in a straight line in a state of overlapping each other, the link mechanism 14 of the present embodiment is designed so that the straightening member 11 protrudes downward from the vehicle body 2 (bumper) and blocks the front side of the front wheel Wf. Furthermore, the vehicular straightening device 10 includes a straightening side stopper St1 for holding the straightening member 11 in a straightening position (refer to FIG. 9) below the vehicle body 2. In the present embodiment, the straightening side stopper St1 is a protrusion protruding from the inner surface of the frame F to the rotary shaft 15 in the axial direction. The straightening side stopper St1 is disposed so as to abut on the other side surface of the driving link 141 at a position where the rotation direction of the intermediate link 142 with respect to the driving link 141 is changed when the driving link 141 is rotated in the clockwise direction (straightening direction) in the drawing by the actuator 13, that is, a position slightly beyond a change point of the link mechanism 14 when the driving link 141 rotates in the straightening direction.

The controller 20 includes a microcomputer having a CPU, a ROM, a RAM, and the like (not illustrated), a drive circuit of the actuator 13 (motor), and the like. In addition, as illustrated in FIG. 1, a vehicle speed sensor 21 for detecting a vehicle speed V of the vehicle 1 is connected to the controller 20. The controller 20 controls the actuator 13 of the drive unit 12 based on the vehicle speed V from the vehicle speed sensor 21 so that the straightening member 11 rotates between the storage position on the side of the vehicle body 2 and the straightening position below the vehicle body 2.

Next, an operation of the vehicular straightening device 10 in the above vehicle 1 will be described.

The straightening member 11 is positioned at the storage position illustrated in FIG. 4 while the vehicle 1 is stopped (parking) or until the vehicle speed V reaches a predetermined straightening start speed V1 (for example, vehicle speed of approximately 60 km/h) after the start of the vehicle 1. As described above, the straightening member 11 is held in the storage position when the driving link 141 of the link mechanism 14 abuts on the storage side stopper St0. In addition, the storage side stopper St0 regulates the rotation of the driving link 141 at a position where the rotation direction of the intermediate link 142 with respect to the driving link 141 is changed (position slightly beyond change point) when the driving link 141 is rotated in the storage direction by the actuator 13. In this manner, the driving link 141 of the link mechanism 14 abuts on the storage side stopper St0, and when the actuator 13 is stopped, the driving link 141 is pressed against the storage side stopper St0 by a force based on the gravity acting on the straightening member 11 transmitted through the straightening member 11, the first and second collar members 17 and 18, the rotary shaft 15, the driven link 143, and the intermediate link 142. Therefore, in the vehicular straightening device 10, it is possible to restrain the link mechanism 14 at the storage position and to favorably hold the straightening member 11 in the storage position.

In addition, when the vehicle speed V is the predetermined straightening start speed V1 or higher after the start of the vehicle 1, as illustrated in FIG. 9, the controller 20 of the vehicular straightening device 10 controls the actuator 13 to rotate in the straightening direction (clockwise direction in FIG. 9) until the driving link 141 of the link mechanism 14 abuts on the straightening side stopper St1, and rotates the straightening member 11 from the storage position to the straightening position. As described above, the straightening member 11 is held in the straightening position by the driving link 141 of the link mechanism 14 abutting on the straightening side stopper St1. Furthermore, the straightening side stopper St1 regulates the rotation of the driving link 141 at a position where the rotation direction of the intermediate link 142 with respect to the driving link 141 is changed (position slightly beyond change point) when the driving link 141 is rotated in the straightening direction by the actuator 13. In this manner, the driving link 141 of the link mechanism 14 abuts on the straightening side stopper St1, and when the actuator 13 is stopped, the driving link 141 is pressed against the straightening side stopper St1 by a force based on the gravity acting on the straightening member 11 transmitted through the straightening member 11, the first and second collar members 17 and 18, the rotary shaft 15, the driven link 143, and the intermediate link 142. Therefore, in the vehicular straightening device 10, it is possible to restrain the link mechanism 14 at the straightening position and to favorably hold the straightening member 11 in the straightening position.

Furthermore, when the vehicle speed V of the vehicle 1 is a straightening end speed V0 (for example, vehicle speed of approximately 40 km/h) or lower, which is lower than the straightening start speed V1, after the vehicle speed V is the straightening start speed V1 or higher, as illustrated in FIG. 4, the controller 20 controls the actuator 13 so as to rotate in the storage direction until the driving link 141 of the link mechanism 14 abuts on the storage side stopper St0, and rotates the straightening member 11 from the straightening position to the storage position. In this manner, in the vehicle 1, during a period from when the vehicle speed V reaches the straightening start speed V1 until the vehicle speed V becomes the straightening end speed V0 or lower, that is, when the vehicle 1 is traveling at a relatively high speed, it is possible to cause the straightening member 11 to suppress the air from the front from hitting the front wheel Wf and thereby to improve the aerodynamic performance of the vehicle 1.

As described above, when the vehicle 1 is traveling at a relatively high speed, the straightening member 11 protrudes downward from the vehicle body 2, and at this time, the straightening member 11 may collide with a front obstacle or the like existing on the road surface. In a case where the straightening member 11 at the straightening position collides with the front obstacle or the like, an external force acts on the straightening member 11 to rotate the straightening member 11 from the straightening position side to the storage position side. In this manner, the straightening member 11 rotates from the straightening position toward the storage position by the action of the external force, and the first collar member 17 of the connecting mechanism 16 fixed to the straightening member 11 rotates around the rotary shaft 15 integrally with the straightening member 11. On the other hand, when the straightening member 11 is positioned at the straightening position, the rotation of the second collar member 18 of the connecting mechanism 16 connected to the driven link 143 of the link mechanism 14 is regulated through the rotary shaft 15 by restraining the link mechanism 14 by the action of the straightening side stopper St1. More specifically, when the rotation of the driving link 141 is regulated by the straightening side stopper St1 at the straightening position, the second collar member 18 is biased in a direction to rotate the straightening member 11 from the storage position side to the straightening position side by a force based on the gravity acting on the straightening member 11.

Figure 10:
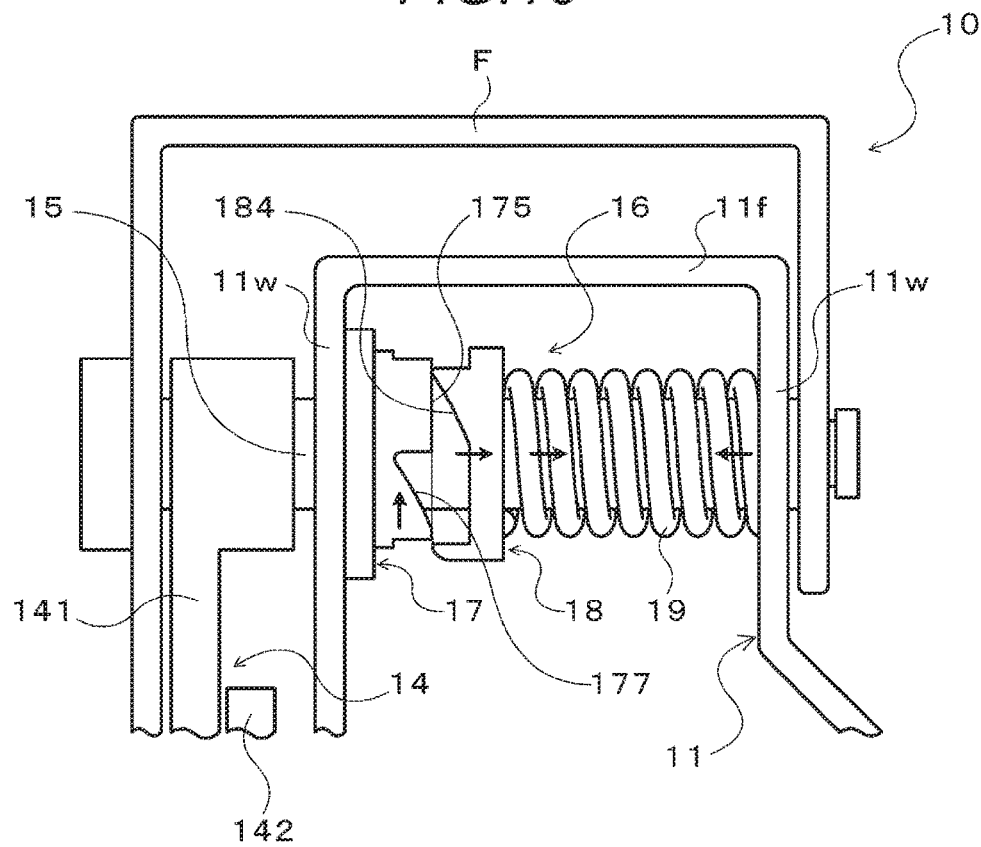
FIG. 10 is a schematic configuration diagram for describing the operation of the vehicular straightening device of this disclosure.

Accordingly, when an external force due to a collision with an obstacle or the like acts on the straightening member 11 at the straightening position, as illustrated in FIG. 10, the first collar member 17 fixed to the straightening member 11 rotates (slides) with respect to the second collar member 18 which tries to stay on the spot. Here, in the vehicular straightening device 10, the spiral surface 177 formed on each pressure portion 176 of the first collar member 17 extends so as to be separated from the second collar member 18 from the front side toward the rear side in the rotation direction of the first collar member 17 when the straightening member 11 rotates from the straightening position side to the storage position side. In addition, the spiral surface 184 formed on each pushed portion 183 of the second collar member 18 extends so as to be close to the first collar member 17 from the front side toward the rear side in the rotation direction of the first collar member 17 when the straightening member 11 rotates from the straightening position side to the storage position side. In this manner, when an external force rotating the straightening member 11 from the straightening position side to the storage position side acts on the straightening member 11, the force in the rotation direction acting on the first collar member 17 is efficiently converted into a force of the rotary shaft 15 in the axial direction at the spiral surface 177 of each pressure portion 176 and is transmitted to the corresponding spiral surface 184 (pushed portion 183) of the second collar member 18.

Figure 11:
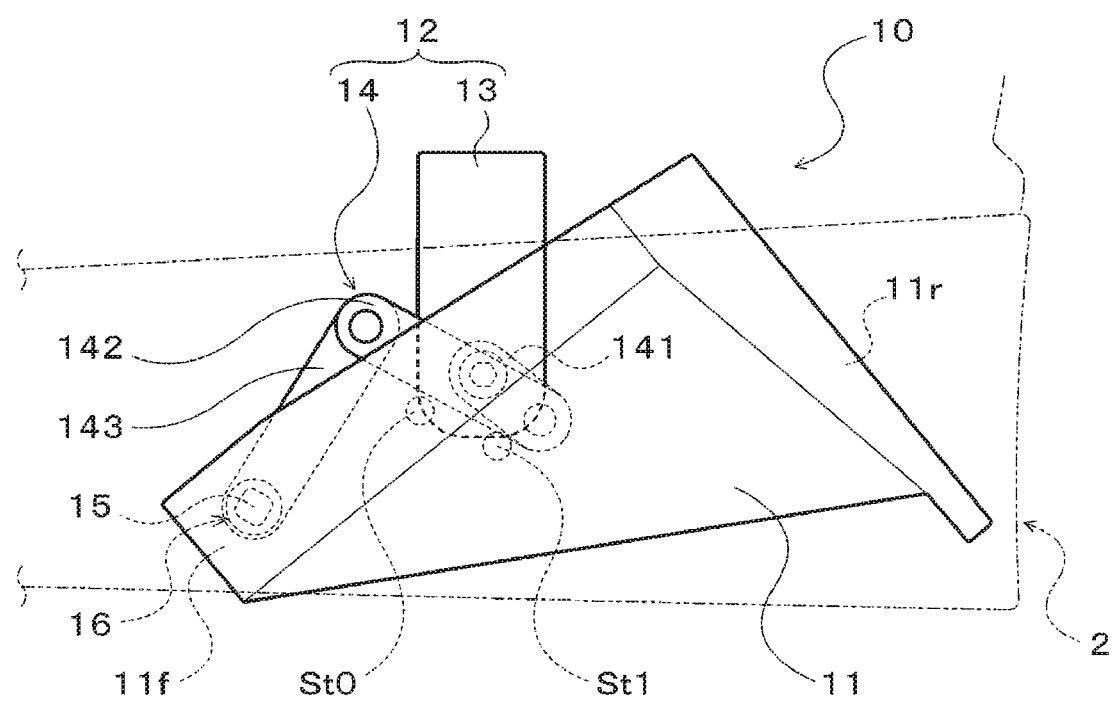
FIG. 11 is a schematic configuration diagram for describing the operation of the vehicular straightening device of this disclosure.

That is, when the external force acts on the straightening member 11 at the straightening position, as illustrated in FIG. 10, the first collar member 17 of the straightening member 11 (each pressure portion 176) presses the second collar member 18 in the axial direction against a biasing force of the spring 19 while integrally rotating with the straightening member 11, and the second collar member 18 is rapidly separated from the first collar member 17 while being regulated in rotation by the rotary shaft 15. When the end surface 175 of the first collar member 17 abuts on the top portion of the spiral surface 184 of the second collar member 18, the engagement in the rotation direction of the first and second collar members 17 and 18 is completely released. As a result, when the straightening member 11 is rotated from the straightening position side to the storage position side by the external force, it is possible to rapidly separate the second collar member 18 from the first collar member 17 so as to release the engagement between the two members in the rotation direction, that is, the connection between the straightening member 11 and the drive unit 12, that is, the link mechanism 14 and the actuator 13. In addition, the second collar member 18 is rapidly separated from the first collar member 17 while the rotation of the second collar member 18 is regulated by the rotary shaft 15 in accordance with the action of the external force on the straightening member 11. Accordingly, as illustrated in FIG. 11, the link mechanism 14 generally maintains the posture when the straightening member 11 is positioned at the straightening position. Therefore, according to the vehicular straightening device 10, the impact (load) applied to the straightening member 11 can be suppressed from being transmitted from the straightening member 11 to the link mechanism 14 or the actuator 13 of the drive unit 12.

As described above, in the vehicular straightening device 10, when the straightening member 11 and the link mechanism 14 of the drive unit 12 are connected to each other by the connecting mechanism 16, it is possible to operate the actuator 13 of the drive unit 12 to move the straightening member 11 up and down with respect to the vehicle body 2 between the storage position and the straightening position on the vehicle body 2 side. In addition, when the external force due to collision with the obstacle or the like acts on the straightening member 11 at the straightening position, the connection between the straightening member 11 and the link mechanism 14 of the drive unit 12 is released by the connecting mechanism 16. In this manner, it is possible to suppress the impact (load) applied to the straightening member 11 from being transmitted from the straightening member 11 to the link mechanism 14 and the actuator 13 of the drive unit 12. As a result, the drive unit 12 that moves the straightening member 11 up and down with respect to the vehicle body 2 can be favorably protected. Accordingly, even if the straightening member 11 collides against the obstacle while the vehicle 1 is traveling, replacement of the link mechanism 14 and the actuator 13, which are expensive as compared with the straightening member 11, can be suppressed, and the cost and the like required for component replacement can be significantly reduced.

In addition, in the vehicular straightening device 10, the straightening member 11 is rotatably supported by the vehicle body 2 such that the rear end portion 11r moves up and down with respect to the vehicle body 2, and the connecting mechanism 16 releases the connection between the straightening member 11 and the link mechanism 14 when the external force that rotates the straightening member 11 from the straightening position side to the storage position side acts on the straightening member 11. In this manner, even if the straightening member 11 at the straightening position collides with the front obstacle or the like, it is possible to suppress the impact (load) applied to the straightening member 11 from being transmitted from the straightening member 11 to the link mechanism 14 and the actuator 13, so that both can be favorably protected.

Furthermore, in the vehicular straightening device 10, the straightening member 11 is freely rotatable around the rotary shaft 15 which is rotated and driven by the drive unit 12. In addition, the connecting mechanism 16 includes the first collar member 17 which is integrated with the straightening member 11 and rotates around the rotary shaft 15, the second collar member 18 capable of engaging with the first collar member 17 in the rotation direction, and supported by the rotary shaft 15 so as to rotate integrally with the rotary shaft 15 and to be movable in the axial direction with respect to the rotary shaft 15, and the spring 19 for biasing the second collar member 18 in the axial direction so as to engage with the first collar member 17. Furthermore, when the straightening member 11 is rotated from the straightening position side to the storage position side by the external force, the first collar member 17 presses the second collar member 18 to be separated from the first collar member 17 against the biasing force of the spring 19. In this manner, it is possible to connect the straightening member 11 and the link mechanism 14 (drive unit 12) when the external force is not acting on the straightening member 11, and to release the connection between the straightening member 11 and the link mechanism 14 when the external force rotating the straightening member 11 from the straightening position side to the storage position side acts on the straightening member 11.

In addition, the first collar member 17 includes the spiral surface extending in a spiral shape around the axis of the first collar member 17 so as to be separated from the second collar member 18 from the front side toward the rear side in the rotation direction of the first collar member 17 when the straightening member 11 rotates from the straightening position side to the storage position side. Furthermore, the second collar member 18 includes the spiral surface 184 extending in a spiral shape along the spiral surface 177 of the first collar member 17 around the axis of the second collar member 18 so as to be close to the first collar member 17 from the front side toward the rear side in the rotation direction of the first collar member 17 when the straightening member 11 rotates from the straightening position side to the storage position side. In addition, the spring 19 biases the second collar member 18 against the first collar member 17 so that the spiral surface 184 of the second collar member 18 abuts on the spiral surface 177 of the first collar member 17. In this manner, when the external force rotating the straightening member 11 from the straightening position side to the storage position side acts on the straightening member 11, it is possible to efficiently convert the force in the rotation direction acting on the first collar member 17 into a force of the rotary shaft 15 in the axial direction and transmit the force to the second collar member 18. Accordingly, it is possible to quickly separate the second collar member 18 from the first collar member 17 so as to release the connection between the straightening member 11 and the link mechanism 14 (drive unit 12).

Furthermore, in the vehicular straightening device 10, a plurality of spiral surfaces 177 of the first collar member 17 and a plurality of spiral surfaces 184 of the second collar member 18 are formed at intervals in the circumferential direction. In addition, the first collar member 17 includes a plurality of torque transmitting surfaces 178 extending to the second collar member 18 side in the axial direction and extending in the radial direction of the rotary shaft 15 from the bottom portion of the corresponding spiral surface 177. The second collar member 18 includes a plurality of torque transmitting surfaces 185 extending from the top portion of the corresponding spiral surface 184 to the side opposite to the first collar member 17 side in the axial direction and extending in the radial direction of the rotary shaft 15. In this manner, when the straightening member 11 and the link mechanism 14 (drive unit 12) are connected to each other by the connecting mechanism 16, it is possible to rotate the straightening member 11 from the straightening position to the storage position while transmitting the rotational torque from the drive unit 12 to the straightening member 11 through the torque transmitting surfaces 178 and 185 of the first and second collar members 17 and 18. Therefore, it is possible to smoothly return the straightening member 11 to the storage position against the gravity.

In addition, the drive unit 12 includes the actuator 13 and the link mechanism 14 including the driving link 141 rotated by the actuator 13, the driven link 143 fixed to the rotary shaft 15, and the intermediate link 142 connecting the driving link 141 and the driven link 143. In addition, the vehicular straightening device 10 includes the straightening side stopper St1 that regulates the rotation of the driving link 141 at a position where the rotation direction of the intermediate link 142 with respect to the driving link 141 is changed, when the driving link 141 is rotated by the actuator 13 so that the straightening member 11 rotates from the storage position to the straightening position. In this manner, it is possible to regulate the movement of the link mechanism 14 at the straightening position and to hold the straightening member 11 favorably at the straightening position. When the straightening member 11 is at the straightening position, the rotation of the driving link 141 is regulated by the straightening side stopper St1, so that the link mechanism 14 is restrained, and accordingly, the rotation of the rotary shaft 15 and the second collar member 18 is regulated. Therefore, in the vehicular straightening device 10, when the external force acting on the straightening member 11 to rotate the straightening member 11 from the straightening position side to the storage position side acts on the straightening member 11, the second collar member 18 can be rapidly separated from the first collar member 17 while regulating the rotation of the second collar member 18 to release the connection between the straightening member 11 and the drive unit 12.

Furthermore, the vehicular straightening device 10 includes the storage side stopper St0 for regulating the rotation of the driving link 141 at a position where the rotation direction of the intermediate link 142 with respect to the driving link 141 is changed when the driving link 141 is rotated by the actuator 13 so that the straightening member 11 rotates from the straightening position toward the storage position. In this manner, it is possible to regulate the movement of the link mechanism 14 at the storage position and to favorably hold the straightening member 11 at the storage position.

In addition, in the vehicular straightening device 10, the spiral surface 177, the torque transmitting surface 178, and the like (engaging portions) engaging with the second collar member 18 are formed on the collar member which is formed separately from the straightening member 11 and non-rotatably fixed to the straightening member 11. In this manner, it is possible to easily integrate the spiral surface 177, the torque transmitting surface 178, and the like engaging with the second collar member 18 of the connecting mechanism 16 with the straightening member 11. However, the spiral surface, the torque transmitting surface, and the like engaging with the second collar member 18 may be formed in the straightening member 11 itself.

In the vehicular straightening device 10, both of the first and second collar members 17 and 18 include the spiral surfaces 177 or 184 as an inclined surface extending along the rotation direction of the first collar member 17, and the disclosure is not limited thereto. That is, a spiral surface serving as an inclined surface may be provided on any one of the first and second collar members 17 and 18, and an abutting portion such as a protrusion or the like which abuts on the spiral surface may be provided on the other of the first and second collar members 17 and 18, and thus, the second collar member 18 may be biased against the first collar member 17 so that the spiral surface and the abutting portion are abutted on each other by the spring 19. Even if such a configuration is adopted, when the external force rotating the straightening member 11 from the straightening position side to the storage position side acts on the straightening member 11, the force in the rotation direction acting on the first collar member 17 can be converted into a force of the rotary shaft 15 in the axial direction by the spiral surface and the abutting portion, and transmitted to the second collar member 18. Accordingly, the second collar member 18 can be separated from the first collar member 17 against the biasing force of the spring 19 by the force in the axial direction. In addition, in the above embodiment, the controller 20 controls the drive unit 12 corresponding to one straightening member 11, and the disclosure is not limited thereto. That is, one controller 20 may be provided for a pair of left and right straightening members 11 (and drive unit 12). Furthermore, the above-described connecting mechanism 16 may be applied to a vehicular straightening device including a plate-like straightening member supported so as to be movable in the height direction (vertical direction) of the vehicle 1 by the vehicle body 2 (bumper).

This disclosure is not limited to the above embodiment at all and it is needless to say that various modifications can be made within the scope of the extension of this disclosure. Furthermore, the above-described embodiments are merely specific aspects disclosed here and described in the Summary section, and do not limit the elements disclosed here and described in the Summary section.

This disclosure can be used in the manufacturing industry of a vehicular straightening device and the like.

A vehicular straightening device according to an aspect of this disclosure includes a straightening member disposed in front of a front wheel of a vehicle so as to be movable upward and downward with respect to a vehicle body, a drive unit that moves the straightening member up and down with respect to the vehicle body between a storage position on a vehicle body side and a straightening position where the straightening member protrudes downward from the vehicle body, and a connecting mechanism that connects the straightening member and the drive unit and releases a connection between the straightening member and the drive unit when an external force acts on the straightening member at the straightening position.

In the vehicular straightening device, when the straightening member and the drive unit are connected by the connecting mechanism, the straightening member can be moved up and down with respect to the vehicle body between the storage position and the straightening position on the vehicle body side by the drive unit. In addition, when the external force due to a collision with an obstacle or the like acts on the straightening member at the straightening position, the connection between the straightening member and the drive unit is released by the connecting mechanism. In this manner, it is possible to suppress an impact (load) applied to the straightening member from being transmitted from the straightening member to the drive unit. As a result, it is possible to favorably protect the drive unit that moves the straightening member up and down with respect to the vehicle body.

The straightening member may be rotatably supported by the vehicle body such that an end portion on a vehicle rear side is moved up and down with respect to the vehicle body, and the connecting mechanism may release the connection between the straightening member and the drive unit when an external force that rotates the straightening member from the straightening position side to the storage position side acts on the straightening member. According to this configuration, even if the straightening member at the straightening position collides with a front obstacle or the like, it is possible to suppress the impact (load) applied to the straightening member from being transmitted from the straightening member to the drive unit, and to favorably protect the drive unit.

The straightening member may be rotatable around a rotary shaft rotated and driven by the drive unit, the connecting mechanism may include a connecting member supported by the rotary shaft so as to be integrally rotated with the rotary shaft and to be movable in an axial direction with respect to the rotary shaft, an engaging portion capable of engaging with the connecting member in a rotation direction, integrated with the straightening member, and rotating around the rotary shaft, and a biasing member biasing the connecting member in the axial direction so as to engage with the engaging portion, and when the straightening member rotates from the straightening position side to the storage position side by the external force, the engaging portion may press the connecting member so as to be separated from the engaging portion against a biasing force of the biasing member. According to this configuration, it is possible to connect the straightening member and the drive unit when the external force is not acting on the straightening member, and to release the connection between the straightening member and the drive unit when the external force rotating the straightening member from the straightening position side to the storage position side acts on the straightening member.

One of the connecting member and the engaging portion may include an inclined surface extending along the rotation direction of the engaging portion, and the other of the connecting member and the engaging portion may include an abutting portion abutting on the inclined surface, and the biasing member may bias the connecting member against the engaging portion so that the inclined surface and the abutting portion abut on each other. According to this configuration, when the external force rotating the straightening member from the straightening position side to the storage position side acts on the straightening member, it is possible to convert the force in the rotation direction acting on the engaging portion into a force of the rotary shaft in the axial direction by the inclined surface and the abutting portion, and to separate the connecting member from the engaging portion against the biasing force of the biasing member by the force in the axial direction.

The biasing member may be a compressive coil spring.

The connecting member may include a spiral surface extending spirally around an axis of the connecting member so as to be close to the engaging portion from a front side toward a rear side in the rotation direction of the engaging portion when the straightening member rotates from the straightening position side to the storage position side, the engaging portion may include a spiral surface extending spirally along the spiral surface of the connecting member around an axis of the engaging portion so as to be separated from the connecting member from the front side toward the rear side in the rotation direction of the engaging portion when the straightening member rotates from the straightening position side to the storage position side, and the biasing member may bias the connecting member against the engaging portion so that the spiral surface of the connecting member abuts on the spiral surface of the engaging portion. According to this configuration, when the external force rotating the straightening member from the straightening position side to the storage position side acts on the straightening member, the force in the rotation direction acting on the engaging portion is efficiently converted into the force of the rotary shaft in the axial direction and the force is transmitted to the connecting member. Accordingly, the connecting member is rapidly separated from the engaging portion and the connection between the straightening member and the drive unit can be released.

A plurality of the spiral surfaces of the connecting member and a plurality of the spiral surfaces of the engaging portion may be respectively formed at intervals in a circumferential direction, the connecting member may include a torque transmitting surface extending from a top portion of the spiral surface to a side opposite to the engaging portion side in the axial direction and extending in a radial direction of the rotary shaft, and the engaging portion may include a torque transmitting surface extending from a bottom portion of the spiral surface to the connecting member side in the axial direction and extending in the radial direction of the rotary shaft. According to this configuration, when the straightening member and the drive unit are connected by the connecting mechanism, the straightening member can be rotated from the straightening position to the storage position while transmitting a torque from the drive unit to the straightening member through the torque transmitting surfaces of the connecting member and the engaging portion. Therefore, it is possible to smoothly return the straightening member to the storage position against the gravity.

A flat end surface about orthogonal to the axis of the connecting member may be formed between the spiral surfaces of the plurality of connecting members, and a flat end surface about orthogonal to the axis of the engaging portion may be formed between the spiral surfaces of the plurality of engaging portions.

The engaging portion may be formed in a collar member that is non-rotatably fixed to the straightening member. According to this configuration, it is possible to easily integrate the engaging portion forming the connecting mechanism with the straightening member.

The drive unit may include an actuator, and a link mechanism including a driving link rotated by the actuator, a driven link fixed to the rotary shaft, and an intermediate link connecting the driving link and the driven link, the vehicular straightening device may further include a stopper that regulates a rotation of the driving link at a position where a rotation direction of the intermediate link with respect to the driving link is changed, when the driving link is rotated by the actuator so that the straightening member rotates from the storage position toward the straightening position. According to this configuration, when the actuator is stopped after operating the actuator so that the straightening member rotates from the storage position to the straightening position, the driving link is pushed against the stopper by a force based on the gravity acting on the straightening member transmitted through the straightening member, the engaging portion, the connecting member, the rotary shaft, the driven link, and the intermediate link. As a result, it is possible to restrain the link mechanism at the straightening position and to favorably hold the straightening member at the straightening position. When the straightening member is at the straightening position, the rotation of the driving link is regulated by the stopper, so that the link mechanism is restrained, and the rotation of the rotary shaft and the connecting member is also regulated accordingly. Therefore, in such a vehicular straightening device, when the external force rotating the straightening member from the straightening position side to the storage position side acts on the straightening member, it is possible to rapidly separate the connecting member from the engaging portion while regulating the rotation of the connecting member to release the connection between the straightening member and the drive unit.

The vehicular straightening device may further include a second stopper that regulates the rotation of the driving link at the position where the rotation direction of the intermediate link with respect to the driving link is changed, when the driving link is rotated by the actuator so that the straightening member rotates from the straightening position toward the storage position. According to this configuration, when the actuator is stopped after operating the actuator so that the straightening member rotates from the straightening position to the storage position, the driving link is pushed against the second stopper by a force based on the gravity acting on the straightening member transmitted through the straightening member, the engaging portion, the connecting member, the rotary shaft, the driven link, and the intermediate link. As a result, it is possible to restrain the link mechanism at the storage position and to favorably hold the straightening member at the storage position.

The vehicular straightening device may further include a controller that controls the drive unit so that the straightening member is positioned at the straightening position during a time period from when a vehicle speed of the vehicle reaches a predetermined straightening start speed until the vehicle speed is a predetermined straightening end speed or lower.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular straightening device comprising:
    a straightening member disposed in front of a front wheel of a vehicle so as to be movable upward and downward with respect to a vehicle body;
    a drive unit that moves the straightening member up and down with respect to the vehicle body between a storage position on a vehicle body side and a straightening position where the straightening member protrudes downward from the vehicle body; and
    a connecting mechanism that connects the straightening member and the drive unit and releases a connection between the straightening member and the drive unit when an external force acts on the straightening member at the straightening position,
    wherein the straightening member is rotatably supported by the vehicle body such that an end portion on a vehicle rear side is moved up and down with respect to the vehicle body,
    the connecting mechanism releases the connection between the straightening member and the drive unit when an external force that rotates the straightening member from the straightening position side to the storage position side acts on the straightening member,
    the straightening member is rotatable around a rotary shaft rotated and driven by the drive unit,
    the connecting mechanism includes
        a connecting member supported by the rotary shaft so as to be integrally rotated with the rotary shaft and to be movable in an axial direction with respect to the rotary shaft;
        an engaging portion capable of engaging with the connecting member in a rotation direction, integrated with the straightening member, and rotating around the rotary shaft; and
        a biasing member biasing the connecting member in the axial direction so as to engage with the engaging portion, and
    when the straightening member rotates from the straightening position side to the storage position side by the external force, the engaging portion presses the connecting member so as to be separated from the engaging portion against a biasing force of the biasing member.

2. The vehicular straightening device according to claim 1,
    wherein one of the connecting member and the engaging portion includes an inclined surface extending along the rotation direction of the engaging portion, and the other of the connecting member and the engaging portion includes an abutting portion abutting on the inclined surface, and
    the biasing member biases the connecting member against the engaging portion so that the inclined surface and the abutting portion abut on each other.

3. The vehicular straightening device according to claim 2,
    wherein the biasing member is a compressive coil spring.

4. The vehicular straightening device according to claim 2,
    wherein the connecting member includes a spiral surface extending spirally around an axis of the connecting member so as to be close to the engaging portion from a front side toward a rear side in the rotation direction of the engaging portion when the straightening member rotates from the straightening position side to the storage position side,
    the engaging portion includes a spiral surface extending spirally along the spiral surface of the connecting member around an axis of the engaging portion so as to be separated from the connecting member from the front side toward the rear side in the rotation direction of the engaging portion when the straightening member rotates from the straightening position side to the storage position side, and
    the biasing member biases the connecting member against the engaging portion so that the spiral surface of the connecting member abuts on the spiral surface of the engaging portion.

5. The vehicular straightening device according to claim 4,
    wherein a plurality of the spiral surfaces of the connecting member and a plurality of the spiral surfaces of the engaging portion are respectively formed at intervals in a circumferential direction,
    the connecting member includes a torque transmitting surface extending from a top portion of the spiral surface to a side opposite to the engaging portion side in the axial direction and extending in a radial direction of the rotary shaft, and
    the engaging portion includes a torque transmitting surface extending from a bottom portion of the spiral surface to the connecting member side in the axial direction and extending in the radial direction of the rotary shaft.

6. The vehicular straightening device according to claim 5, wherein a flat end surface about orthogonal to the axis of the connecting member is formed between the spiral surfaces of the plurality of connecting members, and a flat end surface about orthogonal to the axis of the engaging portion is formed between the spiral surfaces of the plurality of engaging portions.

7. The vehicular straightening device according to claim 1,
wherein the engaging portion is formed in a collar member that is non-rotatably fixed to the straightening member.

8. The vehicular straightening device according to claim 1,
wherein the drive unit includes
an actuator, and
a link mechanism including a driving link rotated by the actuator, a driven link fixed to the rotary shaft, and an intermediate link connecting the driving link and the driven link,
the vehicular straightening device further comprising:
a stopper that regulates a rotation of the driving link at a position where a rotation direction of the intermediate link with respect to the driving link is changed, when the driving link is rotated by the actuator so that the straightening member rotates from the storage position toward the straightening position.

9. The vehicular straightening device according to claim 8, further comprising:
a second stopper that regulates the rotation of the driving link at the position where the rotation direction of the intermediate link with respect to the driving link is changed, when the driving link is rotated by the actuator so that the straightening member rotates from the straightening position toward the storage position.

10. The vehicular straightening device according to claim 1, further comprising:
a controller that controls the drive unit so that the straightening member is positioned at the straightening position during a time period from when a vehicle speed of the vehicle reaches a predetermined straightening start speed until the vehicle speed is a predetermined straightening end speed or lower.

* * * * *